United States Patent [19]

Prenzel et al.

[11] 3,818,776
[45] June 25, 1974

[54] GEAR CHANGING MEANS FOR CHANGE-SPEED GEARBOXES

[75] Inventors: Karl Prenzel, Neu-Katzwang; Hans Barthel, Nurnberg, both of Germany

[73] Assignee: Ardie-Werke GmbH, Nurnberg, Germany

[22] Filed: June 12, 1972

[21] Appl. No.: 261,599

[30] Foreign Application Priority Data
July 23, 1971  Germany............................ 2136960

[52] U.S. Cl. ............... 74/364, 192/67 A, 192/109 F
[51] Int. Cl. ......................... F16h 3/08, F16h 17/00
[58] Field of Search ........ 192/67 A, 109 F; 74/364, 74/866

[56] References Cited
UNITED STATES PATENTS

| | | | |
|---|---|---|---|
| 2,998,732 | 9/1961 | Nelson | 74/364 |
| 3,498,151 | 3/1970 | King | 74/356 |
| 3,530,668 | 9/1970 | Siebers et al. | 74/866 X |
| 3,548,983 | 12/1970 | Hiraiwa | 74/339 X |
| 3,570,636 | 3/1971 | Franz et al. | 74/339 X |
| 3,719,102 | 3/1973 | Leber et al. | 84/364 |

*Primary Examiner*—Arthur T. McKeon
*Attorney, Agent, or Firm*—Clelle W. Upchurch

[57] ABSTRACT

A means is provided for semi-automatically or automatically making gear changes in a multi-ratio change-speed gearbox having mechanical synchronization for motor vehicles and the like comprising a fluid actuated cylinder for moving the movable parts of the gearbox to effect speed change, a source of fluid under pressure, an electromagnetic control valve for directing fluid into the cylinder chambers, means for restricting the speed of flow and means for restricting the pressure on the fluid fed to the control valve and chamber.

10 Claims, 3 Drawing Figures

PATENTED JUN 25 1974   3,818,776

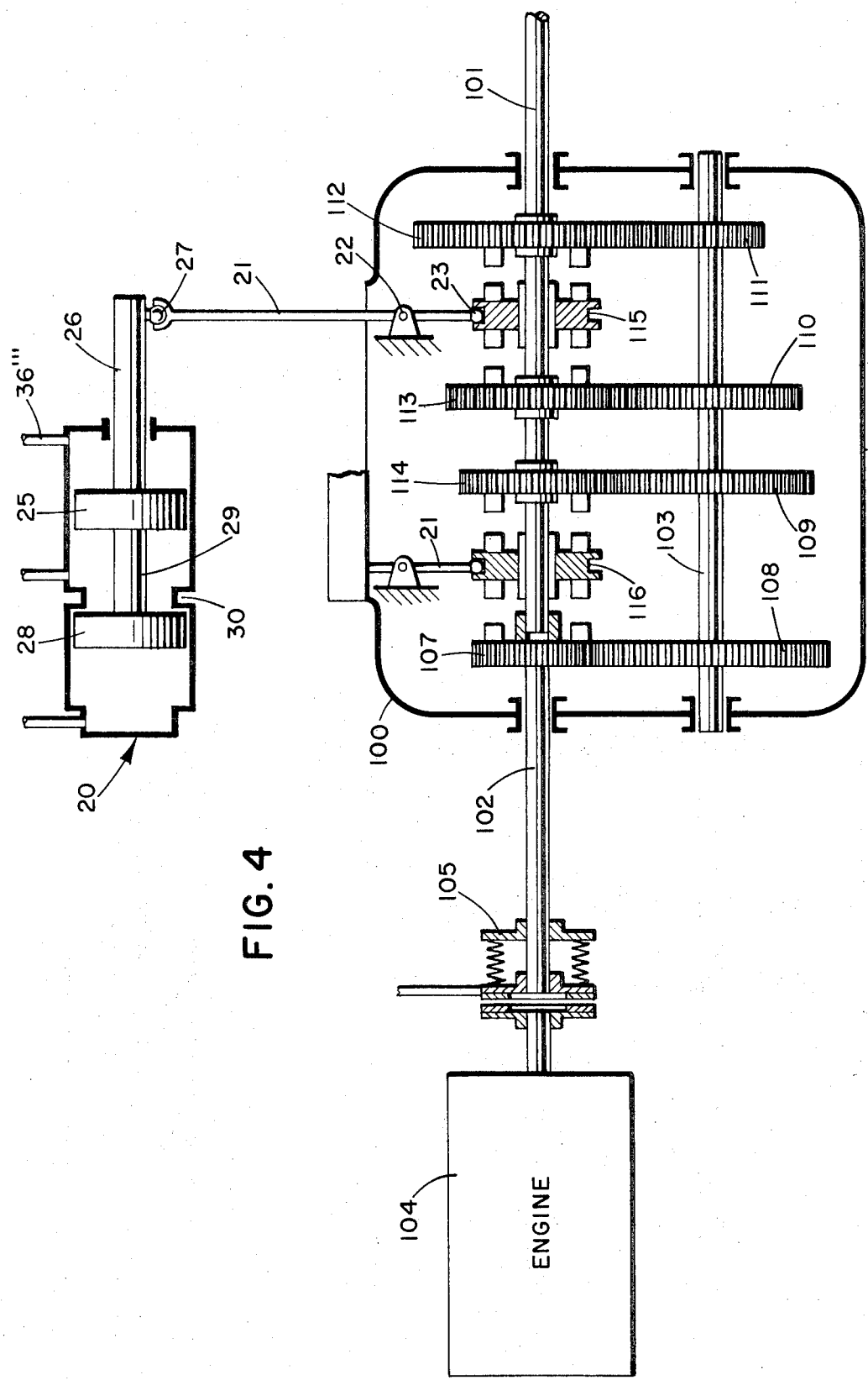

GEAR CHANGING MEANS FOR CHANGE-SPEED GEARBOXES

This invention relates to means for performing automatic or semi-automatic gear changes in multi-ratio change speed gearboxes equipped with synchromesh, for example, in the gearboxes of motor vehicles, the means comprising an electric or electronic member controlling the gear-changing sequence and acting through at least one electromagnetically actuated hydraulic control valve on at least one hydraulic cylinder actuating means for effecting gear changes in the gearbox.

Proposals have already ben made in which, on initiation of a gear-change, the subsequent sequence of events is completely automatic, preferably including also the de-clutching of the driving engine before the gear-change and the engagement of the clutch after the new ratio is engaged. In a prior proposal the engagement of the new ratio is performed suddenly by a hydraulic cylinder, in that the cylinder is suddenly acted on by, or relieved of, an adequate volume of fluid to actuate it rapidly, under the control of a delay-free two-stage electro-hydraulic valve arrangement.

The arrangement is electrically connected to an electric or electronic control member. This can be provided with a device for visibly indicating the gear ratio which is engaged in the gearbox in question and in the case of semi-automatic operation it has push-buttons for selecting the ratio to be engaged and a push-button for initiating the actual engaging sequence, by which the preselected ratios automatically engage. For fully automatic operation the control member is acted on by signals which indicate the instantaneous operating conditions of the associated motor vehicle, for example the engine speed and the accelerator pedal position. Also the control member may be supplied with signals showing the instantaneous positions of all the gear-changing sleeves in the associated gearbox, and furthermore of the movable member of a clutch which is provided between the engine and the gearbox, where the clutch is also to be actuated automatically, under the control of the member by means of an electro-magnetic control valve connected to it. By this proposal the gear ratio can be changed without difficulty and extremely rapidly without there being mechanical synchromesh even in the gearboxes of heavy goods vehicles operatng in hilly country, and fully laden complete with trailers. One of the two rotating members that are to be brought into mesh at each ratio change is slowed down or speeded up very quickly while these members are disconnected from the engine and from the output shaft of the gearbox, so that only small masses have to be slowed down or speeded up. The action of slowing down or speeding up one of the members to achieve the synchronous condition is preferably started as soon as the previously engaged members are disengaged. Such arrangements form the subject of our applications Ser. No. 46,555 filed June 15, 1970 and Ser. No. 187,920 filed Oct. 8, 1971, now U.S. Pat. No. 3,772,933.

If semi-automatic or fully automatic gear changes are performed on these lines in gearboxes provided with mechanical synchromesh, difficulties arise because of the rapidity of the movement, which can lead to damage to the synchromesh cones, which are unable to bring the associated members into synchronism quickly enough.

A gearbox 100 is shown in FIG. 4.

Such gearboxes for motor vehicles generally have a main shaft 101, an input shaft 102 co-axial with it and a layshaft 103 which is parallel to these two shafts. The input shaft 102 is connected to the engine 104 of the vehicle through a friction clutch 105. The main shaft 101 forms the gearbox output shaft and is connected to the driven wheels of the vehicle. Main shaft 101 is capable of being connected to the input shaft at will through different gear ratios, namely, directly so that both shafts rotate at the same speed or indirectly via the layshaft 103 so that the input shaft and output shaft rotate at different speeds.

Secured on the input shaft is a pinion 107 which is in permanent mesh with a gear wheel 108 on the layshaft 103 so that the input shaft and the layshaft always rotate together with a predetermined mutual speed ratio. In addition there are secured on the layshaft as many spur gears, such as 109, 110, 111, as different ratios are required (in addition to direct drive). Meshing with each of these spur gears on the layshaft is a respective pinion on the main shaft or output shaft of the gearbox, such as gears 112, 113, 114, mounted so as to be free to turn on that shaft but axially fixed. Each such pair of gears and pinions provides a different ratio, so that for a given speed of the input shaft all the pinions on the main shaft rotate at a different speed. These pinions are capable of being clutched one at a time to the main shaft and the input shaft is capable of being clutched directly to it, so that the output shaft or main shaft rotates at the speed of the input shaft or of that particular pinion on the output shaft to whic it is clutched.

The clutching is achieved by sliding dog clutches 115, 116 which are keyed or splined to the main shaft to turn with it but to be axially movable on it and are provided with dogs which can be brought into mesh with corresponding dogs on the adjacent pinion or with dogs on the input shaft (direct drive). The clutches 115, 116 may be moved by levers 21.

Such gearboxes may or may not be provided with mechanical synchromesh. As already explained in the introduction above, our earlier proposals were for performing gear changes in boxes without synchromesh. The purpose of the present invention is, in contrast, to allow rapid hydraulically actuated gear changes in gearboxes equipped with synchromesh.

It is an object of this invention to provide an improved means for making gear changes in semi-automatic or automatic gearboxes equipped with synchromesh. Another object of the invention is to provide means in a gearbox having semi-automatic or automatic gear changing means and synchromeshing means with means for synchronizing the associated members thereof without damage to the syncromesh cones. Still another object of the invention is to provide in a gearbox an electric or electronic responsive hydraulic valve means for effecting gear changes.

Other objects will become apparent from the following description with reference to the accompanying drawing wherein.

The foregoing objects and others are achieved according to the invention in a gear-changing mechanism of the kind described in the opening paragraph above in that there are provided in the hydraulic fluid path between a source of hydraulic fluid under pressure and the cylinder a speed restrictor and a pressure restrictor serving to limit the speed of flow and the pressure of the fluid fed through the valve to the cylinder to effect engagement of a ratio.

The speed resitrictor preferably includes a throttle and also includes means for automatically by-passing the throttle on the attainment of a pre-determined pressure downstream of the speed restrictor. There is preferably also a further throttle downstream of the pressure restrictor.

The pressure restrictor may be controlled automatically in accordance with the ratio to be engaged, so as to limit the maximum pressure applied to the cylinder to a valve appropriate to that ratio. So as to allow rapid disengagement of an existing ratio there can be a further electromagnetically operated valve controlled by the control member and serving to allow rapid flow of fluid (by-passing the restrictors) from the source to the cylinder during operation of the cylinder in a direction to shift from an engaged ratio into neutral.

Figure 1:
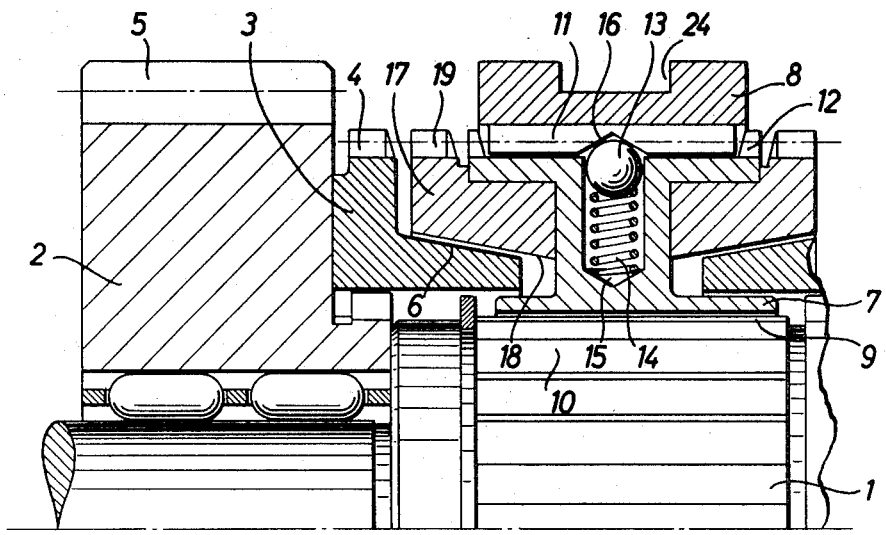
FIG. 1 shows a longitudinal section through part of an orthodox change-speed gearbox for motor vehicles, with balk-ring synchromesh.

FIG. 1 shows the construction of a vehicle gearbox with balk-ring synchromesh. Each pinion 2 which is free to turn on the main shaft 1 of the gearbox, but is axially fixed, is provided with a clutch ring 3 which is keyed to it to turn with it. This has teeth or dogs 4 and the pinion 2 has gear teeth 5. The clutch ring 3 has an axial projection with a conical external surface 6.

The associated gear-changing sleeve is made up of an inner ring 7 and an outer ring 8. The inner ring 7 has internal splines 9 which engage in external splines 10 on the shaft 1 so that it is axially slidable on the shaft but turns with the shaft. In the same way the outer ring 8 is connected to the inner ring 7 to rotate with it but to be axially slidable on it, this being achieved by internal teeth 11 on the outer ring 8, which fit the teeth 4 on the clutch ring 3, and by corresponding external teeth 12 on the inner ring 7. The rings 7 and 8 are normally retained in a central relative position by means of balls, of which one is visible at 13, loaded by springs 14 and mounted in bores 15 in the inner ring 7. Each ball 13 engages a recess 16 in the teeth 11 of the outer ring 8.

In addition each gear-changing sleeve has two laterally disposed balk-rings 17 each having conical internal surface 18 matching the conical external surface 6 of the clutch ring 3 and external teeth 19 corresponding to the teeth 4 and 12 and fitting the teeth 11. The balk-rings 17 are each rotatable by a predetermined limited amount with respect to the rings 7 and 8 the limits being fixed by stops (not shown) on the ring 7. On those ends which are furthest from the associated pinion 2, the teeth 4 and 19 are chamfered so as to be of wedge form in an axial direction so that each tooth of the teeth 4 and 19 has a sort of knife edge at this end. The internal teeth 11 on the outer ring are shaped with corresponding wedge-like chamfers on both sides.

In FIG. 1 there is shown only one of the two pinions associated with the sleeve, the sleeve being shown in the neutral position, i.e., as shown neither of the associated pinions is clutched to the shaft 1.

If now the pinion 2 is to be clutched to the shaft 1, the outer ring 8 is displaced to the left and in doing so it acts through the balls 13 to take the inner ring 7 and the balk-ring 17 with it. The conical inner surface 18 of the left-hand balk-ring 17 in FIG. 1 comes into engagement with the surface 6 of the clutch ring 3. Because of the frictional forces between the two rings 3 and 17 and their difference in speed, the balk-ring 17 immediately turns with respect to the inner ring 7 until it engages the stop (not shown) on the ring 7 so that the teeth 19 of the balk-ring 17 are no longer aligned with the teeth 12 on the inner ring 7 and the further displacement of the outer ring 8 to the left is therefore prevented. But as soon as the sleeve and the pinion 2 are rotating at the same speed, the frictional force between the rings 3 and 17 disappears, so that the force that has been maintained, urging the outer ring 8 to the left, now causes the balk-ring 17, through engagement of the cooperating wedge-shaped faces of the teeth 19 and 11, to be turned back again slightly, allowing the outer ring 8 to continue its movement to the left through the teeth 19 and into mesh with the teeth 4. The pinion 2 is now keyed positively to the shaft 1 to rotate with it.

Such gearboxes with balk-ring synchromesh are known. For performing semi-automatic or fully automatic electrohydraulic gear changes in such gearboxes we use the device according to the invention shown in FIG. 2. Associated with each gear-changing sleeve is a three-position cylinder 20 which, together with the sleeve, is slidable into three positions. The sleeve and cylinder are coupled together by a forked lever 21 which is pivotally mounted in the gearbox housing 22 and engages with its free end 23 in an external annular groove 24 in the outer ring 8 of the sleeve. The three positions are the central neutral position illustrated in FIG. 1 and a left and right-hand engaging position in which the left-hand pinion 2 or the right-hand pinion (not shown in FIG. 1) is clutched to the shaft 1. The cylinder 20 has a piston 25 with a piston rod 26 which has a nose 26 engaging in the lever 21. There is also a second piston 28, having a piston rod 29, in the cylinder 20 and an annular stop 30.

The pistons 25 and 28 are actuated by fluid pressure derived from an accumulator 31. This is supplied with hydraulic fluid from a pump 32, excess fluid returning through a pipe 33 and a relief valve 34 to a reservoir 35 when the accumulator 31 is full.

From the accumulator 31 a pipe leads to an electromagnetically actuated two-position two-way control valve 37 which is followed by two electromagnetically actuated two-position three-way control valves 38 and 39 fed through pipes 36' and 36" and each connected to the cylinder 20 and also to a return pipe 40 leading back to the reservoir 35. The control valve 39 is connected to that part of the cylinder that lies between the two pistons 28 and 25, and the valve 38 is connected to that part of the cylinder which lies on the side of the piston 28 opposite the piston rod 29. The valve 37 is connected through the pipe 36" and a branch pipe 36''' branching off from it ahead of the valve 39, directly to that part of the cylinder which is on that side of the piston 25 furthest from the piston 28.

The valves 37, 38 and 39 are electrically connected to an electric or electronic control member 41 controlling the sequence of operations to be effected during each gear change so that said gear change is performed automatically. Any suitable type of electric or electronic system may be used which the man skilled in the art may readily design so as to provide said control function. One suitable control member is command unit 20 of the Siebers et al U.S. Pat. No. 3,530,668. The control member 41 per se forms no part of the invention.

Figure 2:
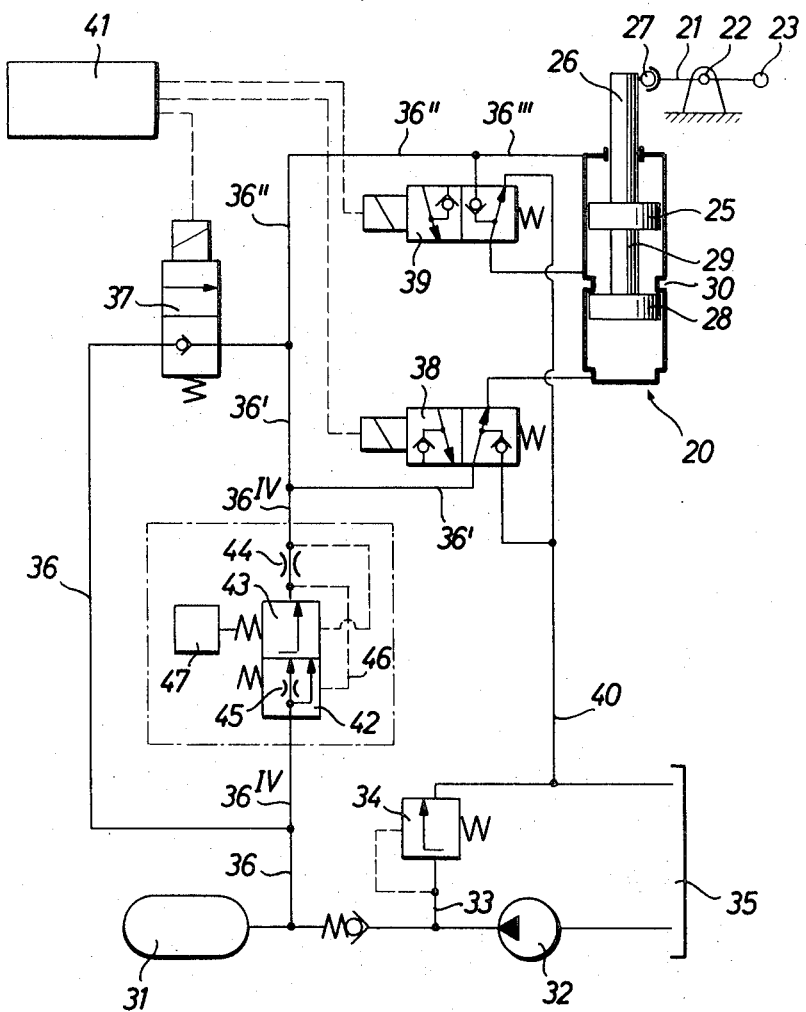
FIG. 2 shows the circuit diagram of means according to the invention for performing ratio changes in the gearbox of FIG. 1.

In FIG. 2 there is only illustrated one cylinder 20, with two control valves 38 and 39 for operating one of the sleeves. The control valves of the further actuating cylinders are connected to the valve 37 and to the pipe 40 and are electrically connected to the control member 41. Alternatively the arrangement could be that according to the proposal of patent application Ser. No. 187,920 filed Oct. 8, 1971.

The feature which forms the subject of the present invention is the provision of a pipe $36^{IV}$ by-passing the control valve 37, and ahead of the valves 38 and 39, in which there are a speed restrictor 42 and a pressure restrictor 43, the latter being followed by a throttle 44. The speed restrictor 42 comprises a throttle 45 and a by-pass in parallel with it, serving to by-pass the speed-restricting throttle 45 as soon as a predetermined pressure $P_{42}$ is reached in the fluid downstream of the throttle 45 but upstream of the throttle 44 a contol line 46 being provided which connects the speed-restrictor to the pipe $36^{IV}$ just upstream of the throttle 44 and which serves to control the said by-passing. The pressure restrictor 43 serves to limit the maximum pressure $P_{43}$ in the pipes $36'$, $36''$, $36'''$ and $36^{IV}$ to a predetermined different value for each of the gear ratios to be engaged.

When the gearbox is in neutral, as shown for example in FIG. 1, all the gear-changing sleeves being in the positions shown in FIG. 1, then all the actuating cylinders are in their intermediate positions as shown in FIG 2. In this condition the two end spaces of each cylinder 20 are connected respectively directly and through the control valve 38 to the valve 37 and are exposed to fluid pressure, whilst the central part of the cylinder between the pistons 28 and 25 is connected to the return pipe 40 through the valve 39. The piston 28 is therefore urged against the stop 30 and the piston 25 is urged against the piston rod 29 of the piston 28. As the surface areas of the pistons 28 and 25 on which the fluid pressure acts are of different sizes, that of the piston 28 being greater than that of the piston 25, the positions of both pistons 28 and 25 are positively defined. When the lever 21 is now to be displaced so that its free end 23 moves downwards as shown in FIG. 2, then the cylinder space behind (i.e., below) the piston 25 is connected through the valve 39 to the pipe $36''$. If on the other hand the lever 21 is to be pivoted from the position shown in FIG. 2 so that its free end 23 moves upwards, then the cylinder space behind or below the piston 28 is connected through the valve 38 to the return pipe 40.

When the pinion 2 is to be clutched to the shaft as shown in FIG. 1, by means of the above-mentioned pivotal movement of the lever 21, then by virtue of the provision of the speed restrictor 42 and the pressure restrictor 43 in the pipe $36^{IV}$ the following sequence occurs. The throttle 45 in the speed restrictor 42 causes the balk-ring 17 to engage the clutch ring 3 of the pinion 2 under the action of a relatively low uniform fluid pressure $P_{42}$ and likewise at a steady relatively low speed $V_{42}$. On mutual engagement of the two rings 17 and 3 the speed restrictor 42 shifts, so that the throttle 45 is now by-passed by the connections 46. The pressure in the pipes $36'$ and $36''$ then rises rapidly to the value $P_{43}$, determined by the pressure restrictor 43 to correspond with the required synchronizing forces, which are different for each ratio. As soon as the speeds of the clutch ring 3 and the balk-ring 17 match, the outer ring is therefore shifted rapidly and at high speed $V_{43}$ to bring its teeth 11 into mesh with the external teeth 4 on the clutch ring 3. The course of the various pressure and speed relationships is illustrated in FIG. 3.

In this way we achieve a satisfactory and trouble-free ratio change in synchromesh gearboxes. In particular, wear or erosion of the co-operating balk-rings and clutch rings are reduced or eliminated despite the fact that the gear-changing sleeves are shifted extremely rapidly in a single step and are suddenly highly loaded by the sudden exposure of the associated cylinder 20 to high pressure hydraulic fluid.

Figure 3:
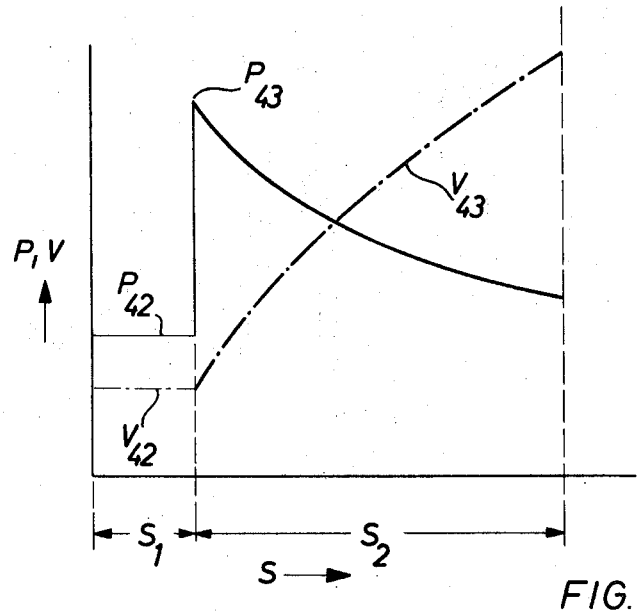
FIG. 3 illustrates the variation of the pressure and speed in relation to the travel of the movable actuating members in the device of FIG. 2.

In the graph illustrated in FIG. 3 the pressure and speed relationships in a gear-changing sequence of the cylinder 20 are illustrated starting from the portion shown in FIG. 2; the ordinate scale shows the fluid pressure P in the pipes $36'$, $36''$, $36'''$ and $36^{IV}$ and the speed V of the movement of the piston rod 26 and thereby of the lever 21 and the associated gear-changing sleeve and of its outer ring 8, and the abscissa scale shows the displacement of these parts which are moved. $S_1$ signifies that travel through which the sleeve is displaced from the position shown in FIG. 1 until the rings 17 and 3 comes into engagement, whereas $S_2$ shows that travel through which the outer ring 8 of the sleeve must then be further displaced until it engages the pinion 2.

The speed restrictor 42 and the pressure restrictor 43 can be by-passed by the valve 37 so that fluid under pressure can flow rapidly from the accumulator 31 to each cylinder 20. This is necessary for rapid displacement of each piston rod 26 from one of the two end positions into the neutral position shown in FIG. 2, i.e., for rapid disengagement of an outer ring 8, which is in mesh with the associated rings 3 and 17, from the corresponding position, shown in FIG. 1. When, for example, with the piston rod 26 in its fully extended position, so that the cylinder space between the pistons 25 and 28 and the cylinder space below the piston 28 are under pressure, the piston rod 26 is now to be brought to the intermediate position illustrated in FIG. 2, the valve 39 is switched over by the control member 41 and the space between the pistons 25 and 28 is connected to the reservoir 35, while the valve 37 causes the space above the piston 25 to be rapidly exposed to fluid under pressure. On the return movement of the piston rod 26 from the fully withdrawn position into the intermediate position the valve 37 is likewise switched over and in addition the valve 38 is switched over so that fluid under pressure flows rapidly into the space below the piston 28.

Although the invention has been described in detail for the purpose of illustration it is to be understood that such detail is solely for that purpose and that variations can be made therein by those skilled in the art without departing from the spirit and scope of the invention except as it may be limited by the claims.

We claim:

1. In a device for semi-automatically or automatically changing the gear ratio in a multi-ratio change speed mechanical synchromesh gearbox for motor vehicles, said gearbox having components to be shifted to change said gear ratio, and said device comprising an electric or electronic means for controlling the automatic sequence of each gear change, a source of fluid under pressure, an actuating cylinder for moving said components of the gearbox to be shifted to effect gear change and electromagnetic control valves connected electrically to the said controlling means, the said actuating cylinder being connected by pipes to said source of fluid under pressure and the said control valves being arranged in said pipes to provide fluid under pressure to said actuating cylinder in response to commands received from said controlling means to effect gear changing; the combination of fluid flow control means and fluid pressure control means arranged in said pipes between said source of fluid under pressure and said cylinder, said control means controlling the rate of fluid flow and the pressure, respectively, of the fluid flowing through the said pipes during a gear change.

2. The device of claim 1 wherein the said fluid flow control means comprises a throttle and means for by-passing the said throttle responsive to fluid pressure down-stream of said throttle.

3. The device of claim 2, wherein the said fluid flow control means is arranged up-stream of said fluid pressure control means, a second throttle is provided down-stream of said fluid pressure control means, and said fluid control means is connected by a pipe to a point between the fluid pressure control means and the second throttle to control the said by-passing of said throttle of the fluid flow control means.

4. The device of claim 1 having a plurality of actuating cylinders.

5. The device of claim 4 wherein each said actuating cylinder has three chambers, a piston movable through the chamber and carrying an outwardly projecting piston rod associated with the components in the gearbox to be shifted, and separate means for delivering said fluid under pressure to each chamber comprising a two-position three-way control valve.

6. The device of claim 5 in which the cylinder has a projecting piston rod capable of occupying three stable positions, two end positions corresponding to the engagement of different ratios in the gear box and an intermediate neutral position, said piston rod being connected to a first piston in the cylinder, a second piston connected to the first piston by a second piston rod, means in the wall of the cylinder for stopping the second piston while the first piston is spaced from the adjacent end of the cylinder to thereby divide the cylinder into three chambers, and separate means for delivering fluid under pressure into each chamber.

7. The device of claim 1 wherein the means for controlling the fluid pressure is responsive to the synchronizing forces of each gear ratio.

8. The device of claim 1 wherein the flow rate control means is by-passed by a conduit provided with an electro-magnetic two-position two-way control valve connected to said electric or electronic actuating means, said control valve permitting flow of fluid to the cylinder when in its open position.

9. In a device for semi-automatically or automatically changing the gear ratio in a multi-ratio change speed mechanical synchromesh gearbox for motor vehicles, said gearbox having components to be shifted to change said gear ratio, and said device comprising an electric or electronic means for controlling the automatic sequence of each gear change; a system for actuating said components to change the gear ratio comprising a three-position cylinder, a first piston in said cylinder carrying a first piston rod, a lever coupling the first piston rod to a said component, a second piston, a second piston rod connecting the pistons together, and means for introducing a fluid under pressure into the cylinder comprising an accumulator, conduits leading from the reservoir to the cylinder and a pump for transferring fluid under pressure from the accumulator to the cylinder, a first electro-magnetically acutated control valve responsive to said sequence control means and disposed in a conduit between the accumulator and cylinder, a conduit extending between said first valve and said cylinder between said pistons and a separate conduit extending between the said first control valve and said cylinder between the second piston and the adjacent end of the cylinder, a second electro-magnetically actuated control valve responsive to said sequence control means and in a conduit which extends between the first control valve and between the pistons in the cylinder, a third electro-magnetically actuated control valve responsive to said sequence control means and in the conduit which extends between the first control valve and between the second piston and the end of the cylinder, means for flow of fluid from the valves to the accumulator, a first by-pass conduit between said accumulator and said second and third control valves by-passing said first control valve, means comprising a throttle for restricting the rate of flow of fluid through the said by-pass conduit, means downstream of the said throttle for restricting the pressure in said by-pass conduit, and a second by-pass conduit connected to said first by-pass conduit and extending from upstream of said throttle to downstream of the pressure restricting means for flow of fluid around said throttle at a predetermined fluid pressure downstream of the throttle.

10. The device of claim 9 wherein the system has a second throttle in the conduit between the pressure-restricting means and the second and third valves and the second by-pass extends from downstream of the first throttle to upstream of the second throttle and downstream of the pressure-restricting means.

* * * * *